United States Patent [19]

Traylor

[11] Patent Number: 4,623,123

[45] Date of Patent: Nov. 18, 1986

[54] CONDUIT COUPLING

[76] Inventor: Paul Traylor, 16591 Milliken Ave., Irvine, Calif. 92714

[21] Appl. No.: 727,930

[22] Filed: Apr. 26, 1985

[51] Int. Cl.⁴ .......................................... F16K 31/00
[52] U.S. Cl. ..................................... 251/340; 285/14; 285/39; 285/93; 285/321; 285/388; 285/423
[58] Field of Search .................. 285/387, 81, 388, 82, 285/321, DIG. 25, 14, 39, 93, 423; 251/340

[56] References Cited

U.S. PATENT DOCUMENTS

| | | |
|---|---|---|
| 100,665 | 3/1970 | Potter . |
| 931,128 | 8/1909 | Keith . |
| 1,440,207 | 12/1922 | Burns . |
| 2,339,615 | 1/1944 | Castelli . |
| 2,750,240 | 6/1956 | Naab . |
| 2,768,037 | 10/1956 | Payne . |
| 2,899,836 | 8/1959 | Cushman et al. . |
| 3,426,656 | 2/1969 | Bimba . |
| 3,426,797 | 2/1969 | Baker .................... 251/340 |
| 3,466,073 | 9/1969 | Pohle . |
| 3,521,911 | 7/1970 | Hanes et al. ............. 285/321 X |
| 3,531,144 | 9/1970 | Bizilia . |
| 3,887,222 | 6/1975 | Hammond . |
| 4,062,571 | 12/1977 | Sicard .................... 285/388 X |
| 4,120,596 | 10/1978 | Kunkle . |
| 4,277,197 | 7/1981 | Bingham . |
| 4,435,005 | 3/1984 | Berger ................... 285/388 X |

FOREIGN PATENT DOCUMENTS

| | | |
|---|---|---|
| 636390 | 2/1962 | Canada ..................... 251/340 |
| 836317 | 6/1960 | United Kingdom ............ 285/321 |

Primary Examiner—Dave W. Arola
Attorney, Agent, or Firm—Fulwider, Patton, Rieber, Lee & Utecht

[57] ABSTRACT

A conduit coupling having in one embodiment a coupling body, a union nut adapted to slip over the free end of the coupling body, and a clip cooperative with a special configuration of the coupling body to engage the nut and prevent its inadvertent separation from the body. Various forms of clip are disclosed. In another embodiment of the coupling the body includes an annular section having a raised portion, a resilient band mounted upon the annular section, and a ring having a venting opening and rotatable upon the band to vent the interior of the coupling whenever the venting opening is out of alignment with the raised portion.

10 Claims, 18 Drawing Figures

U.S. Patent  Nov. 18, 1986  Sheet 1 of 3  4,623,123
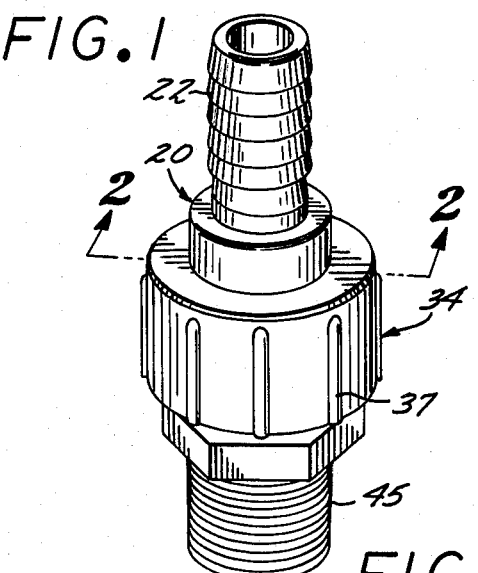
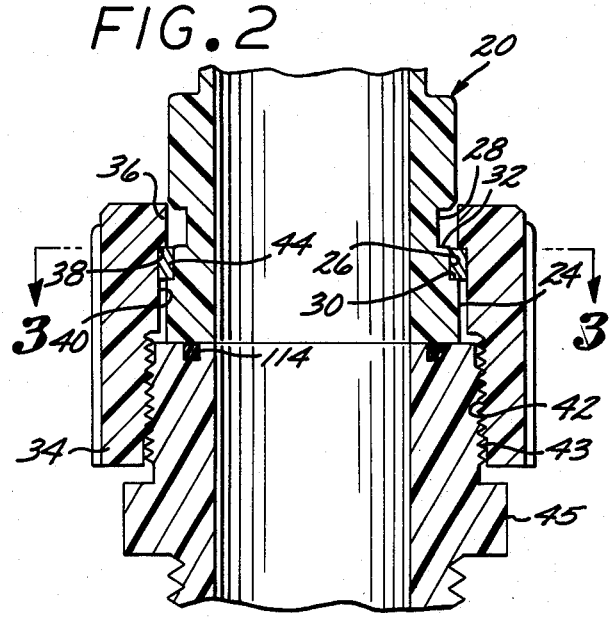
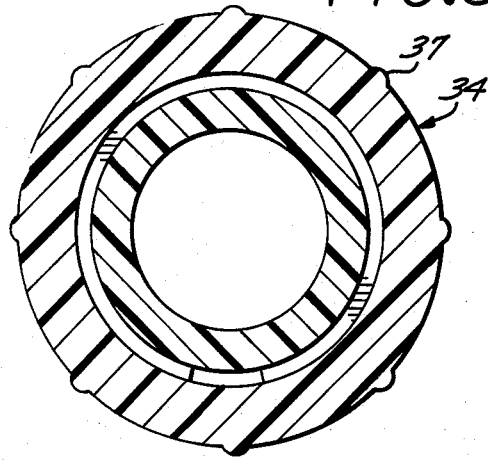
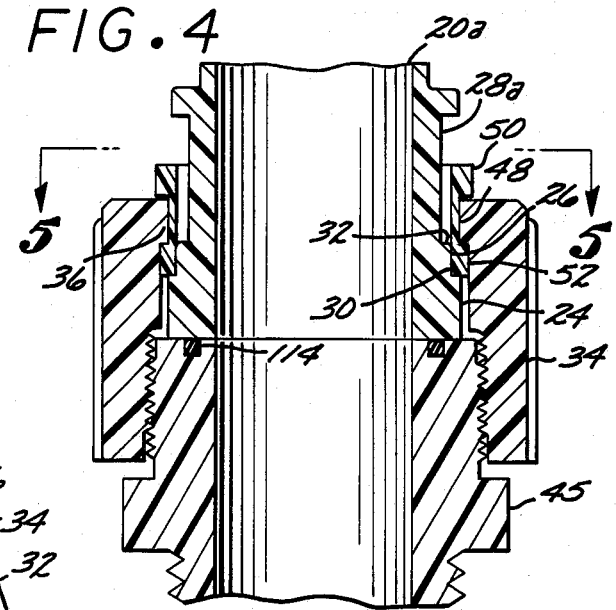
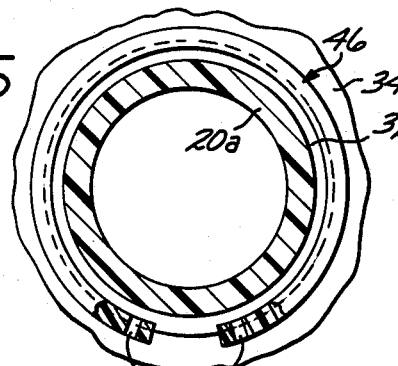
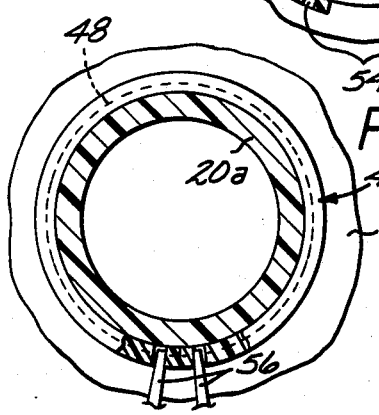
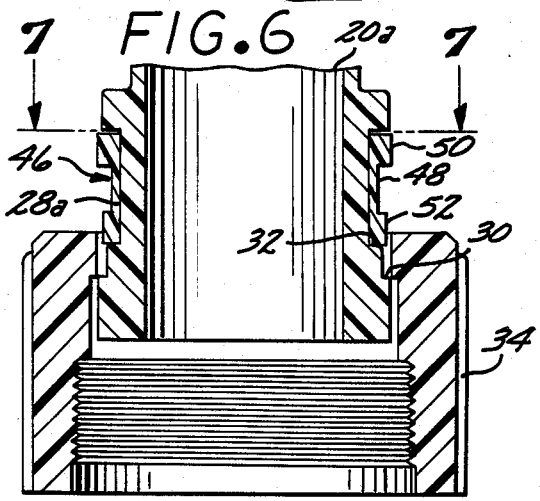

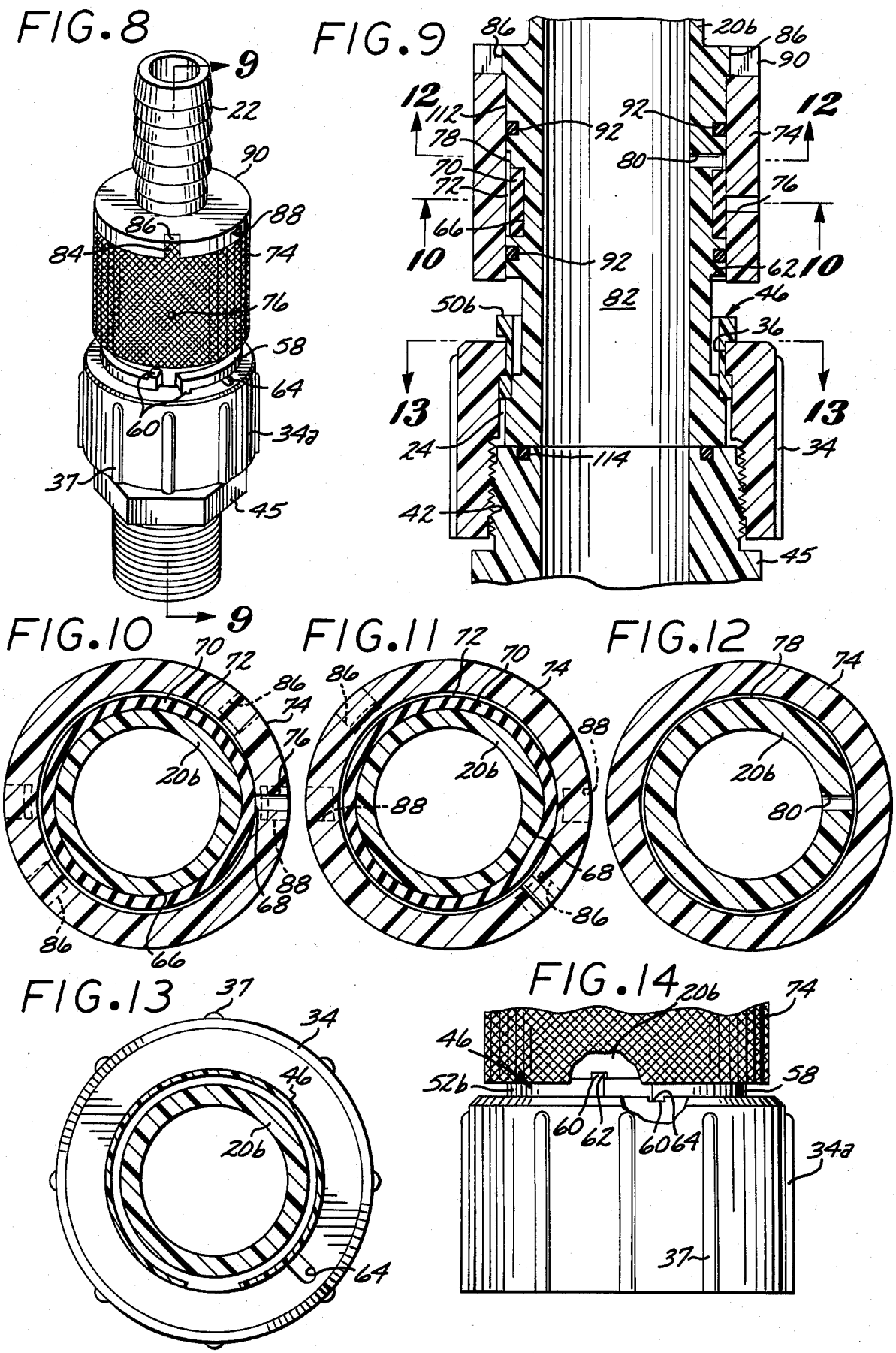

CONDUIT COUPLING

BACKGROUND OF THE INVENTION

1. Field of the Invention:

The present invention relates to a conduit coupling and particularly to a union conduit coupling wherein the union nut is adapted to be fitted over the free end of the conduit coupling body.

2. Description of the Prior Art:

The typical union coupling includes a larger diameter portion on the free extremity of the conduit body. The female union nut is slipped over the opposite end of the conduit body until the flange of the nut engages the enlarged portion of the conduit body extemity. The nut is then retained on the coupling body, but is free to rotate for connection with a male fitting or the like. In many instances it is not practical to mount the union nut onto the coupling body from the end opposite its free end. Accordingly, the prior art teaches a conduit body having a groove adapted to receive a C-shape clip for engagement with the nut flange to retain the nut in position. With this arrangement the nut is slipped over the free end of the coupling body, the clip is installed in the groove, and the coupling is ready for use. This system has a number of shortcomings, particularly the requirement that the exterior of the coupling body inwardly of its free extremity must be free of any connections, walls, or other obstructions which would prevent the full length of the union nut from passing inwardly on the coupling body sufficiently to place the clip in position in the coupling groove.

The prior art is also deficient in providing a means for quickly and easily bleeding off or pressure venting conduits, conduit couplings and the like. Typically a T-shape coupling or the like is interposed in the conduit to be vented and a petcock or similar small valve is used to selectively vent off gases or liquids or relieve excessive pressures. This arrangement is relatively expensive, requires extra fittings and presents an awkward or unslightly protusion from the body of the conduit.

Another form of venting arrangement is the provision of spaced O-rings in grooves of a conduit, with a longitudinally slidable sleeve carried on the O-rings and slidable to uncover a vent opening through the wall of the conduit between the pair of O-rings. In this arrangement an O-ring tends to be pinched and rolled out of its groove, possibly even being blown out of the groove by escaping pressure. Various other means for venting internal conduit pressures are shown in the prior art, but usually they are relatively expensive and incapable of directing the vented gas or fluid in a predetermined direction.

A need for an improved venting arrangement exists particularly in replacing service "exchange tanks" for water treatment such as deionization treatment. Residual pressure in the tank must be vented in order to minimize water spillage during the tank exchange, and air that is always entrapped in the top of a freshly installed tank should preferably be vented for efficient operation of the tank. Venting is also desirable to avoid the sudden escape of pressurized air and water mixtures the next time the tank is exchanged. Both safety and convenience considerations are involved.

SUMMARY OF THE INVENTION

According to the present invention, a conduit coupling is provided which comprises a body, and a female union nut carried by the body for connection to a complemental male fitting or conduit. The body includes exterior surfaces of gradually decreasing diameters constituting outer, intermediate and inner sections. The union nut includes an inwardly directed annular flange adapted to pass over the free extremity of the coupling body to a position adjacent the coupling inner section. In one embodiment a circumferentially discontinuous C-shape clip is received upon the inner section, and the flange is adapted to pass over the compressed clip to a position inwardly of the inner section, at which point the clip expands resiliently for engagement by the nut flange. Outward longitudinal movement of the nut then carries the clip onto the body intermediate section, and the relative dimensions of the body outer section, clip and nut operate to trap or capture the clip between the nut flange and the body so that the nut cannot come off the free extremity of the coupling body.

In another embodiment the clip inner section of the coupling body is made relatively wide to receive a specially configured, relatively wide clip characterized by an annular central channel bounded by annular inner and outer shoulders. With this arrangement the nut flange is adapted to pass over the clip in its compression position on the inner section, and engage the clip inner shoulder to locate the flange in position over the clip channel, at which point the clip is radially expansible to receive the flange within the channel. Inward movement of the nut flange brings the flange into engagement with the clip inner shoulder, carrying the clip from the inner section and onto the intermediate section. There the clip is captured in close relationship between the flange and the coupling body, preventing further outward movement of the nut flange and separation from the coupling body.

If it is desired to provide a means for readily re-compressing the clip to enable deliberate outward movement of the nut and separation from the coupling body, the adjacent extremities of the clip can be provided with openings adapted to receive the pin-like jaws of a pliers or other suitable tool for urging the split ends together onto the inner section. A further modification of the clip can be made in which no such tool is required. Thus, the free extremities of the clip can be provided with oppositely longitudinally directed projections adapted for receipt within appropriate detents provided in the nut flange and the coupling body whereby opposite rotation of the nut and body urges the clip ends together for compression of the clip upon the coupling body inner section.

In yet another embodiment of the invention the coupling body is provided with an exteriorly directed band section having a lesser diameter portion upon which is mounted a resilient band. A cylindrical ring having a venting opening is rotatable upon the band to bring the vent opening into alignment with the vent cavity defined between the interior surface of the ring and the resilient band where it rests upon the lesser diameter portion of the band section. The coupling includes vent passage means providing communication between the vent cavity and the interior of the conduit for venting the conduit interior upon alignment of the ring vent opening and the vent cavity between the band and the ring.

Other objects and features of the invention will become apparent from consideration of the following description taken in connection with the accompanying drawings.

BRIEF DESCRIPTION OF THE DRAWINGS

FIG. 1 is a perspective view of a conduit coupling according to the present invention;

FIG. 2 is an enlarged view taken along the line 2—2 of FIG. 1;

FIG. 3 is a view taken along the line 3—3 of FIG. 2;

FIG. 4 is a view similar to FIG. 2, but illustrating a removable clip embodiment;

FIG. 5 is a view taken along the line 5—5 of FIG. 4;

FIG. 6 is a view similar to FIG. 4, but illustrating the modified clip in a compressed state enabling separation of the union nut from the coupling body;

FIG. 7 is a view taken along the line 7—7 of FIG. 6;

FIG. 8 is a perspective view of another embodiment of coupling adapted for selective venting of the interior of the coupling;

FIG. 9 is an enlarged view taken along the line 9—9 of FIG. 8;

FIG. 10 is a view taken along the line 10—10 of FIG. 9, illustrating the cylindrical ring in its closed (non-venting) position;

FIG. 11 is a view similar to FIG. 10, but illustrating the cylindrical ring in its venting position;

FIG. 12 is a view taken along the line 12—12 of FIG. 9;

FIG. 13 is a view taken along the line 13—13 of FIG. 9;

FIG. 14 is a detailed view of a longitudinal or side elevational view of the embodiment of FIG. 8, particularly illustratiang the seating of the clip projections within the nut and conduit body detents;

DESCRIPTION OF THE PREFERRED EMBODIMENTS

Figure 15:
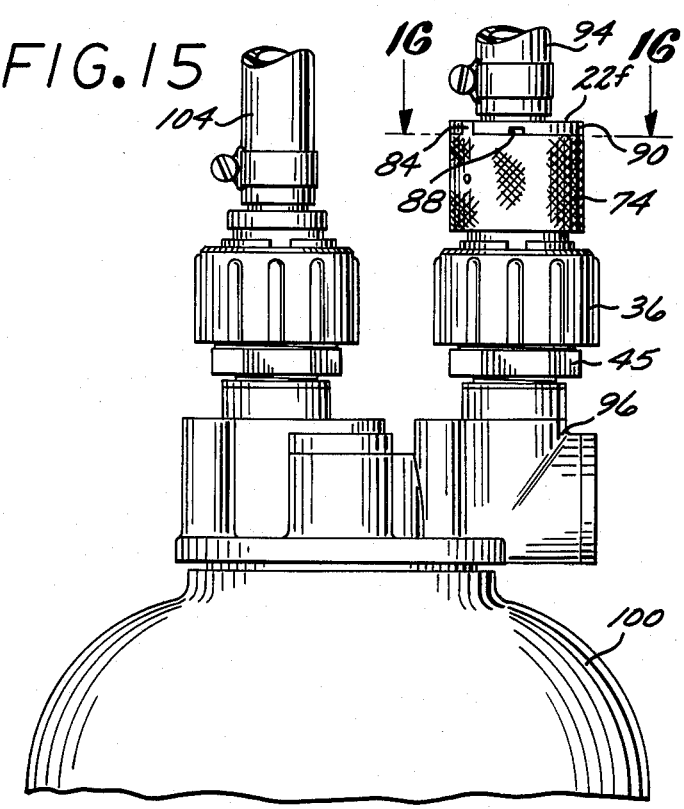
FIG. 15 is a front elevational view of the coupling of FIG. 8 operatively mounted upon a typical deionization "exchange tank"
Figure 16:
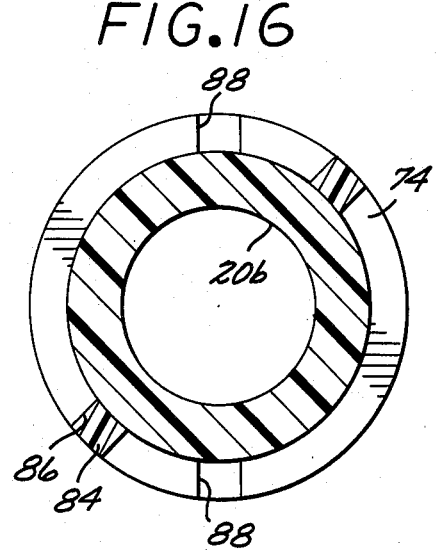
FIG. 16 is an enlarged view taken along the line 16—16 of FIG. 15.

Referring now to the drawings, and particularly to FIGS. 1-7, there is illustrated a conduit coupling according to the present invention and comprising, generally, a cylindrical conduit body 20 having typical means for connection to a conduit (not shown) such as threads or circumferential hose barbs 22. At its opposite or free extremity the body 22 includes annular or circumferentially directed, and axially extending outer, intermediate and inner sections 24, 26 and 28 respectively. The exterior diameter of the intermediate section 26 is less than that of the outer section 24 to define an annular stop shoulder 30, and the exterior diameter of the inner section 28 is less than that of the intermediate section 26 to define an annular seating shoulder 32.

The conduit coupling also includes a union nut 34 provided with means for turning it, such as flats (not shown) or circumferentially spaced ribs 37 on its outer surface. The nut 34 includes an annular, radially inwardly directed flange 36 at its inner extremity which defines an annular locking shoulder 38 with the adjacent greater diameter internal wall section 40 of the nut 34.

The nut 34 also includes suitable means, such as threads 42 at its outer extremity, for connection to a complemental conduit fitting 45.

The interior diameter of the flange 36 is greater than the exterior diameter of the outer section 24 to enable the flange 36 to pass inwardly over the conduit body 20 to an inward position inwardly of the inner section 28, that is, inwardly of the position of the nut 34 illustrated in FIG. 2.

The conduit coupling also includes an annular, resilient and circumferentially discontinuous C-shape clip 44 which in the embodiment of FIG. 1 is generally rectangular in cross-section. Like the other materials of the present conduit coupling, the material of the clip 44 is preferably made of a plastic material suitable for plumbing applications or the particular use to which the conduit coupling is to be made. The plastic material of the clip 44, however, is selected to be resilient so that with only moderate effort it can be circumferentially compressed or expanded, and yet spring back to an expanded state upon release of the compression force. In its radially compressed state or condition the clip 44 can be located or received upon the inner section 28 in a compressed or first state, where it is in engagement with the body seating shoulder 32. In this first state the clip 44 has an exterior diameter less than the interior diameter of the nut flange 36 so that the flange 36 can pass over it and beyond the inner section 28. Once past the inner section 28, the larger diameter wall section 40 of the nut is presented to the exterior of the clip 44, enabling the clip 44 to expand and engage the nut locking shoulder 38.

Outward movement of the nut 34 carries the clip 44 over the seating shoulder 32, which typically is slightly beveled or rounded to facilitate this action, and the clip 44 then is received upon the intermediate section 26 in engagement with the stop shoulder 30. The clip 44 is thus captured or entrapped between the nut locking shoulder 38 and the body stop shoulder 30, preventing the nut 34 from moving any farther outwardly, and thereby preventing its separation from the coupling body 20. In this captured position the clip 44 cannot significantly expand or compress because the outer diameter of the intermediate section 26 approximates the inner diameter of the clip 44, and the inner diameter of the wall section 40 is only slightly more than the outer diameter of the clip 44. In other words, the fit is quite snug. In addition, at all times the nut 34 is free to rotate.

In the prior art clip arrangements the clip would normally be located in position over the inner section 28 and, should the clip become broken in use it would collapse inwardly and undesirably allow the nut 34 to separate from the coupling body 20. The operation of the clip 44 is different in that once it reaches the locked or second state illustrated in FIG. 2, even breakage of the clip 44 into a number of sections normally would not interfere with its locking action. This is because the space for the clip 44 is fixed by the adjacent circumferential surfaces of the intermediate section 26 and the wall section 40, and consequently the clip pieces cannot move radially inwardly or outwardly.

If desired, the leftmost face of the clip 44, as seen in FIG. 2, can be made to slope longitudinally outwardly and radically inwardly, and stop shoulder 30 complementarily sloped, so that as the nut 34 is tightened upon the male fitting 45 the clip 44 would be driven forcibly against the surface of the intermediate section 26.

With particular reference to FIGS. 4-7, a modified clip 46 is illustrated which is adapted to be received within a longer inner section 28a of a coupling body 20a, the subscript "a" being used to denote parts which are similar but not identical to the corresponding parts of the embodiment of FIG. 1.

The clip 46 includes an annular channel 48 having a width adapted to receive the nut flange 36, and bounded on either side by annular inner and outer shoulders 50 and 52, respectively. On compression of the clip 46 in its compressed or first state overlying the inner section 28a, the exterior diameter of the inner shoulder 50 is greater than the internal diameter of the nut flange 36 so that the inner shoulder 50 is located outwardly of the nut flange 36 at all times. However, as can be seen from FIG. 6, the outer diameter of the outer shoulder 52 in the compressed or first state of the clip 46 is less than the inner diameter of the nut flange 36 so that the nut can freely pass over the outer shoulder 52 during placement of the nut 34 over the free extremity of the coupling body 20a.

The seating of the clip 46 upon the intermediate section 26 is the same as described in connection with the embodiment of FIG. 1, except that only a portion of the clip 46 rests on the intermediate section 26. However, the result is the same, and the union nut 34 cannot be removed from the coupling body 20a.

By reason of the exposed inner shoulder 50, a means is presented whereby the clip 46 can be compressed when it is desired to remove the nut 34 from the coupling body 20a. As best seen is FIGS. 5 and 7, the compression means may take the form of first engagement means or openings 54 in the adjacent extremities, respectively, of the clip 46. The openings 54 are adapted to receive the pins or projections 56 of the pliers of a compression tool (not shown) for bringing together the adjacent ends of the clip 46 and thereby holding the clip 46 in its compressed state until the nut 34 can be moved longitudinally outwardly away from the clip 46 for separation from the coupling body 20a.

As best seen in FIGS. 8 and 14, yet another form of clip 58 is illustrated which is identical to the clip 46 except that the inner shoulder 50b of the clip includes engagement means in the form of a pair of longitudinally oppositely directed projections 60 on the adjacent extremities, respectively, of the clip 58 which are adapted to be received in engagement means on the coupling body 20b and the nut 34a. These engagement means take the form, respectively, of detents 62 and 64, respectively, whereby, upon relative rotation of the coupling body 20b and the nut 34a, the clip 58 will be compressed to permit the nut 34a to be separated from the coupling body 20b. The subscript "b" is used to denote parts similar but not identical to the corresponding parts of FIG. 1.

With the foregoing arrangement it will be apparent that the union nut can easily be passed over the free extremity of the coupling body, and over the compressed clip, to allow the clip to expand and capture the union nut so that it can be rotated but cannot be axially separated from the coupling body. The nut is always in position for mating of its threads 42 with the male fitting 45, effecting a liquid and pneumatic tight relation by any suitable means, such as by an O-ring 114 carried in an annular groove in the male fitting 45 and bearing against the end face of the coupling body. Other suitable sealing means may include usual O-rings disposed between the nut and the adjacent portions of the fitting 45 and the coupling body, as will be apparent to those skilled in the art.

Referring now to FIGS. 8-12, there is illustrated a conduit system particularly adapted for bleeding off or venting internal pressure from the interior of a conduit.

More particularly, a conduit venting arrangement is illustrated which is combined with the union coupling and clip arrangement described in connection with the embodiments of FIGS. 4-7.

The modified coupling body 20b includes a circumferential surface 112 having a lesser diameter, exteriorly directed annular band section 66 having a larger diameter raised portion or lobe 68, as best seen in FIGS. 10-12. A band 70 made of rubber or similar resilient material overlies the band section 66 and, in the area where it overlies the band section 66, the band 70 defines a vent cavity 72 with the adjacent inner surface of a cylindrical sleeve or ring 74.

The ring 74 includes a through or vent opening 76 which can be brought into alignment with the vent cavity 72 upon rotation of the ring 74.

The vent cavity 72 is in communication with a circumferential channel 78 formed in the body of the coupling body 20b, and the channel 78 is in turn in communication with a bore or opening 80 extending into the interior 82 of the coupling body 20b, the opening 80, channel 78 vent cavity 72 and vent opening 76 forming vent passage means to provide communication between the interior 82 and the environment.

If desired, the ring 74 can be provided with means to provide a visual and tactile indication of when the ring 74 is located in position to vent the body interior 82. For this purpose, as seen in FIGS. 8, 9, 10 and 11, the ring 74 is provided with one or more inwardly and axially extending projection 84 receivable within one or more full slots 86 and partial slots 88 spaced predetermined circumferential distances apart about the periphery of an increased diameter portion or locking flange 90 integral with the coupling body 20b.

The ring 74 is normally rotatable upon a pair of resilient seals 92 carried within suitable axially spaced apart grooves provided in the exterior surface of the coupling body 20b, thereby providing a fluid tight seal on either side of the vent cavity 72. The ring 74 is also movable axially outwardly to unseat the projection 84 from a partial slot 88 to enable the ring 74 to be rotated for receipt of the projection 84 in a full slot 86. Seating of the projection 84 in the full slot 86 constitutes the venting position of the system, as seen in FIG. 11. Location of the system in a non-venting or locked position is accomplished in a reverse manner, by axially moving the ring 74 and rotating it until the projection 84 is fitted within a partial slot 88, as seen in FIG. 10. The full slots are located at approximately 180 degree intervals, and one or the other is selected, as desired, to properly direct the vent opening 76 for discharge of the vented liquid or gas. The shape and placement of one or more of the vent openings 76 may be varied as desired so long as the opening or openings overlie vent passage 72.

The venting system is relatively inexpensive and easy to install in a conduit and is quickly and easily operated simply by rotating the ring 74, as described. The rubber band 70 provides a unique means to form the vent cavity 72, in combination with the molded-in shape of the underlying lesser diameter portion 68 of the coupling body 20b. In addition, the resilient band 70 can be rotated as needed to present ever-different areas for wear, thereby prolonging the service life of the band.

Figure 17:
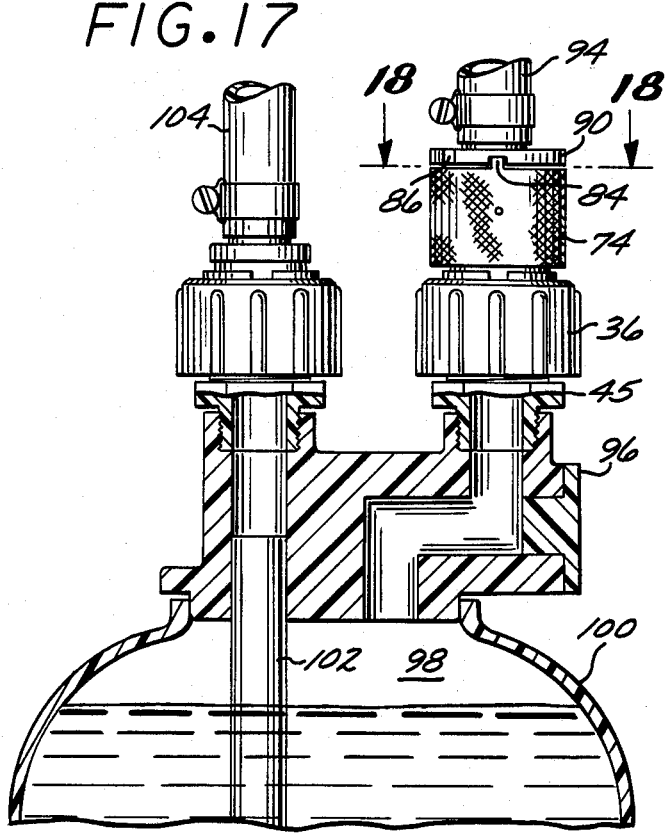
FIG. 17 is a partial longitudinal cross-sectional view of the embodiment of FIG. 15.
Figure 18:
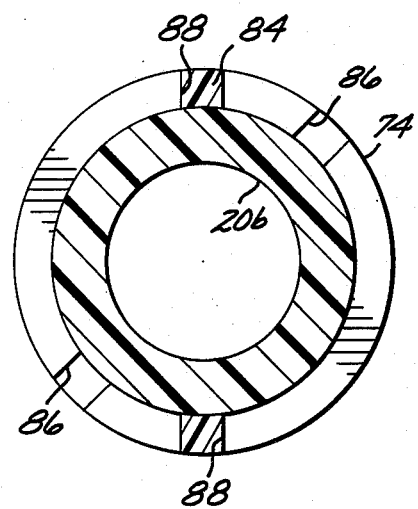
FIG. 18 is an enlarged view taken along the line 18—18 of FIG. 17.

The venting arrangement of FIGS. 8–12 is useful in a variety of situations but is particularly useful in a "tank exchange" application, such as that illustrated in FIGS. 15–18. More particularly, in the non-venting position of the coupling body 20b, as seen in FIG. 17, pressurized fluid is able to pass through an inlet conduit 94 to a deionization "exchange tank" manifold 96 for discharge into an upper area 98 of a deionization tank 100. The water is then drawn up through a riser pipe 102 for discharge through an outlet conduit 104.

Assuming the tank 100 was not vented immediately after the last installation, at the time it is exchanged for a fresh tank, the interior area 98 is vented prior to disconnection of the nut 36 from the tank adapter 45. This is easily done by axially moving the ring 74 from the half slot position of FIG. 17 to the full slot position 86 of FIG. 15 for venting the area 98. Once venting is completed it is a simple matter to return the ring 74 to the position of FIG. 17, remove the exhausted tank and replace it with a fresh tank. typically, the installer will fill the newly installed tank and then vent it in the manner just described, rather than leave the gas trapped within area 98 during usage of the installed tank. after the fresh tank has been connected in position and all of the air has been vented from the area 98.

In the tank application just described, the union nut arrangement works very well, the abutting faces at the O-ring 114, as seen in FIG. 2, providing an excellent seal, and with the union nut enabling rapid connection and disconnection of the coupling to successive tanks. The combination of a union coupling function and a pressure venting coupling function in the single device of the present invention satisfies a long felt need in this particular application. Of course, the venting arrangement described can be applied to many more applications, as will be apparent to those skilled in the art.

Various modifications and changes may be made with regard to the foregoing detailed description without departing from the spirit of the invention.

I claim:

1. A conduit coupling comprising:
   a body having annular, axially extending outer, intermediate and inner sections, the exterior diameter of said intermediate section being less than that of said outer section to define an annular stop shoulder, and the exterior diameter of said inner section being less than that of said intermediate section to define an annular seating shoulder;
   a union nut having an annular, radially inwardly directed flange defining an annular locking shoulder, said nut further having connection means at its outer extremity for connection to a complementary conduit fitting, the interior diameter of said flange being greater than the exterior diameter of said other section whereby said flange is adapted to pass inwardly over said body to an inward position adjacent said inner section; and
   an annular resilient and circumferentially discontinuous clip having a radially compressed condition for location upon said inner section in a first state, in engagement with said seating shoulder of said body, and enabling passage of said flange to an inner position, the exterior dimensions of said clip in its expanded condition enabling said locking shoulder of said flange to engage said clip and move it to a second state in engagement with said stop shoulder of said body whereby said nut is prevented from passing outwardly and separating from said body, said clip including an annular channel adapted to receive said flange and bounded by annular inner and outer shoulders, the exterior diameter of said inner shoulder or compression of said clip in said first state being greater than the internal diameter of said flange whereby said inner shoulder is located outwardly of said nut in said first and second states of said clip.

2. A conduit coupling according to claim 1 wherein in said expanded condition of said clip, the interior dimensions of said clip enable said clip to fit snugly but rotatably upon said intermediate section, and said exterior dimensions of said clip in said expanded condition enable said clip to fit snugly but rotatable relative to the adjacent surfaces of said nut.

3. A conduit coupling according to claim 1 and including compression means having first engagement means on said clip adapted for engagement to radially compress said clip to a compressed condition whereby said flange may be moved outwardly over said clip for separation of said nut from said body.

4. A conduit coupling according to claim 3 wherein said first engagement means define adjacent openings in the adjacent extremities, respectively, of said clip, said openings being adapted to receive the pins of a compression tool.

5. A conduit coupling according to claim 3 wherein said compression means comprises second engagement means on said nut and third engagement means on said body operative, on relative rotational movement of said nut and said body, to engage said first engagement means and move together the adjacent extremities of said clip and thereby place said clip in said compressed condition.

6. A conduit coupling according to claim 5 wherein said second and third engagement means comprise openings in said nut and said body, respectively, and said first engagement means comprise projections on the adjacent extremities, respectively, of said clip for projection into said openings upon said relative movement.

7. A conduit coupling according to claim 1 wherein said body includes an annular, exteriorly directed and circumferentially continuous band section having a predetermined diameter and a lesser diameter portion;
   a resilient circumferentially continuous band overlying and circumferentially coextensive with said band section and defining a vent cavity where said band overlies said lesser diameter portion; seal means on opposite sides of said lesser diameter portion, and
   a cylindrical ring carried upon band and sealingly engaging said seal means and having a vent opening, intermediate said seal means said ring being movable on said band to bring said vent opening into alignment with said vent cavity, and said body including vent passage means intermediate said seal means providing communication between the interior of said body and said vent cavity.

8. a conduit means according to claim 7 wherein said body and said ring include, respectively, complementary interfitting means having an engaged position preventing said movement of said ring, said ring being operative for disengaging said interfitting means to enable said movement of said ring.

9. A conduit means comprising:
   a cylindrical conduit body including an annular, exteriorly directed and circumferentially continuous band section having a lesser diameter portion; seal means on opposite sides of said lesser diameter portion, a resilient circumferentially continuous band overlying and circumferentially coextensive with said band section and defining a vent cavity where said band overlies said lesser diameter portion; and a cylindrical ring carried upon said band and sealingly engaging said seal means and having a vent opening, intermediate said seal means said ring being movable on said band to bring said vent opening into alignment with said vent cavity, and said body including vent passage means intermediate said seal means providing communication between the interior of said body and said vent cavity.

10. A conduit means comprising:

a cylindrical body having an annular, exteriorly directed and circumferentially continuous band section having a raised lobe portion and vent passage means providing communication between the interior of said body and said band section; seal means on said cylindrical body with said band section and vent passage means located therebetween, a resilient circumferentially continuous band overlying and circumferentially coextensive with said band section and defining a vent cavity in the regions of said band section adjacent said lobe portion; and a cylindrical ring carried upon said band and sealingly engaging said seal means and having a vent opening to atmosphere, said ring being movable on said band to bring said vent opening from alignment with said vent cavity into alignment with said lobe portion to close off said vent opening to the atmosphere.

* * * * *

UNITED STATES PATENT AND TRADEMARK OFFICE
CERTIFICATE OF CORRECTION

PATENT NO.  : 4,623,123

DATED       : November 18, 1986

INVENTOR(S) : Paul Traylor

It is certified that error appears in the above-identified patent and that said Letters Patent is hereby corrected as shown below:

Column 8, line 4, delete "or" and insert "on"

Signed and Sealed this

Tenth Day of March, 1987

*Attest:*

DONALD J. QUIGG

*Attesting Officer*  *Commissioner of Patents and Trademarks*